2,857,312
ESTERS OF ERYTHROMYCIN AND CARBOMYCIN

Verlin C. Stephens, Indianapolis, Ind., assignor to Eli Lilly and Company, Indianapolis, Ind., a corporation of Indiana No Drawing. Application September 25, 1953
Serial No. 382,483

11 Claims. (Cl. 167—65)

This invention relates to derivatives of certain antibiotic agents and more particularly to reaction products of antibiotics with dibasic acid anhydrides, and to therapeutic compositions embodying such products.

It is known that erythromycin and carbomycin can not be administered intramuscularly because of the irritation and tissue damage which they cause at the site of injection. Although oral preparations of these antibiotics are available and are widely used, parenterally injectable preparations are oftentimes desired to obtain rapidly a therapeutically effective blood level of the antibiotic and to treat moribund patients, or other patients who for one reason or another are unable to tolerate oral medication.

I have discovered that erythromycin and carbomycin react with anhydrides of dibasic carboxylic acids to form reaction products which avoid the disadvantageous pain, irritation and tissue damage characteristic of other preparations heretofore tried for intramuscular administration. My new compounds when incorporated into a suitable vehicle and administered intramuscularly, show substantially no local irritation at the site of injection. Moreover, preparations incorporating my compounds exert an antibiotic activity equivalent to the amount of erythromycin or carbomycin contained therein, and so avoid the necessity of administering excessive amounts of the antibiotic compound to provide adequate therapy.

The novel antibiotic compounds of this invention are obtained by reacting erythromycin or carbomycin with an anhydride of a dibasic carboxylic acid, the reaction being carried out in a substantially anhydrous solvent which will not react with the reagents employed. Suitable inert solvents include the lower ketones, ethers, esters and other similar polar solvents in which the antibiotic and the anhydride are somewhat soluble.

The reaction products are in general only slightly or moderately soluble in the solvent employed, and so are easily isolated by cooling the reaction mixture and filtering off the desired product. For recovery of the maximum amount of reaction product, the solvent can be partially or completely evaporated. Alternatively, there can be added to the reaction mixture an inert miscible solvent in which the reaction product is substantially insoluble, to cause precipitation of the desired product.

Anhydrides which can be employed in producing my novel compounds are the anhydrides of those dibasic carboxylic acids which form cyclic or inner anhydrides, i. e., succinic acid, glutaric acid, maleic acid, phthalic acid and the like.

Electrometric titration of the novel compounds shows the presence of two titratable groups, an acid and a basic group. The infrared absorption spectrum indicates the presence of an ester group. Accordingly, it is believed that in the reaction products one carboxyl group of the dibasic acid is esterified with a hydroxyl group of the antibiotic agent, and the remaining carboxyl group is unreacted except as it may form an inner salt with the basic group of the antibiotic agent. Because of the presence of both an acidic and a basic group, the reaction products are amphoteric in nature and display increased water solubility at high and low pH values. In substantially neutral solution, they have a limited water solubility which is of the order of one percent or less.

The novel compounds of this invention are stable in dry form, and are stable when dissolved or suspended in non-aqueous vehicles. In aqueous solvents, especially those which are non-neutral in character, they are only moderately stable because they gradually hydrolyse to the free antibiotic agent and the dibasic acid.

It should be noted that in vitro tests on the reaction products per se show only about one half of the activity of the free antibiotic compound. The full antibiotic activity is obtained by permitting an aqueous sample of the material to be tested to stand for a time sufficient to permit the complete hydrolysis of the reaction product. Since erythromycin and carbomycin are acid-labile, test solutions should be buffered on the alkaline side during the hydrolysis period. Any diminished in vitro activity of the reaction products is of no significance with respect to their therapeutic efficacy, since the compounds appear to be very quickly hydrolysed in the body fluids and consequently exert the full antibiotic activity of which they are potentially capable.

The following examples give the preparation and properties of illustrative compounds of this invention.

EXAMPLE 1

*Preparation of the succinyl derivative of erythromycin*

A mixture of 60 g. of erythromycin, 8.2 g. of succinic anhydride and 300 ml. of anhydrous acetone was slowly warmed, thoroughly agitated, and filtered to remove a small amount of insoluble impurities. The filtrate was boiled until the first appearance of a precipitate. Heating was then discontinued, and the mixture was allowed to stand until precipitation was complete. The precipitate which consisted of the reaction product of erythromycin and succinic anhydride was collected on a filter, was washed with two 50 ml. portions of acetone, and was dried in air.

The succinyl derivative of erythromycin thus prepared melted with decomposition at about 135–145° C. Recrystallization from acetone yielded a product with unchanged melting point.

EXAMPLE 2

*Preparation of the maleyl derivative of erythromycin*

A mixture of 15 g. of erythromycin, 2.5 g. of maleic anhydride and 150 ml. of anhydrous acetone was treated in accordance with the procedure of Example 1.

The maleyl derivative of erythromycin thus prepared melted with decomposition at about 150–157° C.

EXAMPLE 3

*Preparation of the phthalyl derivative of erythromycin*

The procedure of Example 1 was followed, except that 15 g. of erythromycin, 3 g. of phthalic anhydride and 150 ml. of anhydrous ethyl acetate were used.

The phthalyl derivative of erythromycin melted with decomposition at about 155–160° C.

EXAMPLE 4

*Preparation of the glutaryl derivative of erythromycin*

A mixture of 15 g. of erythromycin, 2.9 g. of glutaric anhydride and 150 ml. of anhydrous ethyl acetate was warmed slowly, filtered to remove insoluble substances, boiled for a few minutes, and allowed to stand overnight at room temperature. The ethyl acetate was removed by evaporation in vacuo until a thick syrup remained as a residue. About 100 ml. of ethyl ether were added to the syrup, and the walls of the flask were scratched with a glass rod to induce crystallization. The crystalline precipitate of the glutaryl derivative of erythromycin which formed, was collected on a filter and washed with ether. After recrystallization from a mixture of benzene and ethyl acetate, it melted with decomposition at about 125–135° C.

EXAMPLE 5

*Preparation of the succinyl derivative of carbomycin*

A mixture of 4.3 g. of carbomycin, 0.5 g. of succinic anhydride and 50 ml. of anhydrous acetone was heated to boiling on a steam bath for about one hour. The solution was evaporated in vacuo, and the residue was dissolved in 75 ml. of warm anhydrous ethyl acetate. On cooling, the succinyl derivative of carbomycin crystallized. It was removed by filtration, washed with cold ethyl acetate and dried in air.

The succinyl derivative of carbomycin thus prepared melted at about 153–157° C. An additional amount of the derivative was obtained by concentrating the mother liquor to about one-half its original volume, and adding a two-fold volume of petroleum ether.

For therapeutic use the compounds of my invention are administered intramuscularly as suspensions or solutions in parenterally acceptable vehicles. As before mentioned, the compounds are only slightly soluble in water. Consequently, aqueous suspensions are required to provide a therapeutically adequate amount of the antibiotic compound without excessive amounts of vehicle. To avoid the necessity of administering a suspension, and also to avoid the hydrolytic effect of the water which causes a gradual decomposition of the mono-acid ester compound, it is preferable to employ a substantially anhydrous vehicle in which the antibiotic compound is soluble. Of the vehicles of the foregoing nature which can be employed I have found that the liquid polyethylene glycols which have average molecular weights ranging from 200 to 700 are especially suitable.

It is also desirable to incorporate in the composition a local anesthetic to avoid what minor discomfort and irritation is produced by intramuscular administration of the antibiotic compound. Any of the local anesthetics suitable for injection can be employed, but the most satisfactory anesthetics appear to be those described in the copending U. S. patent application of Albert Pohland, Serial No. 319,783, filed November 10, 1952. To afford a ready solubility in the polyethylene glycol, the local anesthetics generally are employed in the form of their free bases.

An illustrative preferred composition for intramuscular administration is obtained by mixing the following ingredients in the proportions given, and filtering the solution through a Seitz filter to sterilize the solution.

| | Mg. |
|---|---|
| Erythromycin succinate | 70 |
| 1-benzamido-1-phenyl-3-piperidinopropane | 20 |
| Polyethylene glycol 200, q. s. 1 ml. | |

Intramuscular administration of about 1 ml. of the above composition provides the equivalent of about 50,000 units of erythromycin and produces a therapeutically effective blood level of the antibiotic.

In place of erythromycin succinate in the above composition, any of the other novel antibiotic compounds can be employed.

The concentration of the antibiotic compound in the composition can be varied over a wide range. Preferably, however, an amount is used which is equivalent to from 10,000 to 100,000 units (micrograms) of antibiotic per milliliter of composition.

For distribution to the trade, the compositions can be made up in single dose vials which contain one or two milliliters of the composition, or in multiple dose vials which contain 10 milliliters or more. As is customary, a preservative in the amount of about 5 mg. per milliliter of composition is added. Suitable preservatives include phenol, methyl p-hydroxy-benzoate and the like.

I claim:

1. A half-ester of an antibiotic of the group consisting of erythromycin and carbomycin with a dibasic carboxylic acid capable of forming a cyclic anhydride.

2. A half-ester of erythromycin with a dibasic acid of the group consisting of succinic acid, maleic acid, glutaric acid and phthalic acid.

3. A half-ester of carbomycin with a dibasic acid of the group consisting of succinic acid, glutaric acid, maleic acid and phthalic acid.

4. Erythromycin acid succinate.

5. Erythromycin acid maleate.

6. Carbomycin acid succinate.

7. A therapeutic composition comprising a solution, in liquid polyethylene glycol having average molecular weight in the range of about 200 to 700, of a half-ester of an antibiotic of the group consisting of erythromycin and carbomycin with a dibasic carboxylic acid capable of forming a cyclic anhydride, and an injectable local anesthetic compound.

8. A therapeutic composition comprising a solution, in liquid polyethylene glycol having average molecular weight in the range of about 200 to 700, of a half-ester of an antibiotic of the group consisting of erythromycin and carbomycin with a dibasic carboxylic acid capable of forming a cyclic anhydride, said ester being present in an amount equivalent to from 10,000 to 100,000 micrograms of antibiotic per milliliter of composition, and an injectable local anesthetic compound.

9. A therapeutic composition according to claim 8 in which the ester is erythromycin acid succinate.

10. A therapeutic composition according to claim 9, in which the local anesthetic is 1-benzamido-1-phenyl-3-piperidinopropane.

11. The reaction product of erythromycin and glutaric anhydride having the structure:

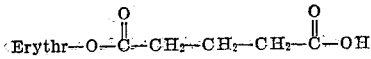

in which Erythr is the erythromycin radical obtained by the removal of a hydroxyl radical.

References Cited in the file of this patent

UNITED STATES PATENTS

| 2,560,891 | Regna | July 17, 1951 |
| 2,653,899 | Bunch et al. | Sept. 29, 1953 |

FOREIGN PATENTS

| 1,031,467 | France | June 24, 1953 |

OTHER REFERENCES

Tanner et al.: "Some Properties of Magnamycin," Antibiotics and Chemotherapy, September 1952, pages 441–443.